(12) United States Patent
Chan (10) Patent No.: US 8,286,182 B2
(45) Date of Patent: Oct. 9, 2012

(54) METHOD AND SYSTEM FOR DEADLOCK DETECTION IN A DISTRIBUTED ENVIRONMENT

(75) Inventor: Wilson Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 12/792,542

(22) Filed: Jun. 2, 2010

(65) Prior Publication Data

US 2010/0242050 A1 Sep. 23, 2010

Related U.S. Application Data

(62) Division of application No. 11/075,068, filed on Mar. 8, 2005, now Pat. No. 7,735,089.

(51) Int. Cl.
*G06F 9/46* (2006.01)
(52) U.S. Cl. ........................................................ 718/106
(58) Field of Classification Search ........................ None
See application file for complete search history.

(56) References Cited

U.S. PATENT DOCUMENTS

| 5,377,351 | A | * | 12/1994 | Kotera et al. | 1/1 |
| 5,440,743 | A | * | 8/1995 | Yokota et al. | 710/200 |
| 5,649,184 | A | * | 7/1997 | Hayashi et al. | 711/147 |
| 5,832,484 | A | * | 11/1998 | Sankaran et al. | 1/1 |
| 6,904,431 | B2 | * | 6/2005 | Holmgren | 1/1 |
| 6,973,651 | B1 | * | 12/2005 | Ching et al. | 718/100 |
| 2002/0199045 | A1 | * | 12/2002 | Browning et al. | 710/100 |
| 2003/0023656 | A1 | * | 1/2003 | Hutchison et al. | 709/100 |
| 2003/0144980 | A1 | * | 7/2003 | Holmgren | 707/1 |
| 2004/0025164 | A1 | * | 2/2004 | Ma et al. | 718/107 |
| 2004/0199734 | A1 | * | 10/2004 | Rajamani et al. | 711/163 |
| 2006/0085608 | A1 | * | 4/2006 | Saika | 711/162 |

OTHER PUBLICATIONS

Choudhary et al. "A Modified Priority Based Probe Algorithm for Distributed Deadlock Detection and Resolution". IEEE Transactions on Software Engineering, vol. 15, No. 1, Jan. 1989.*

* cited by examiner

*Primary Examiner* — Emerson Puente
*Assistant Examiner* — Adam Lee
(74) *Attorney, Agent, or Firm* — Hickman Palermo Truong Becker Bingham Wong LLP (57) ABSTRACT

A method of deadlock detection is disclosed which adjusts the detection technique based on statistics maintained for tracking the number of actual deadlocks that are detected in a distributed system, and for which types of locks are most frequently involved in deadlocks. When deadlocks occur rarely, the deadlock detection may be tuned down, for example, by reducing a threshold value which determines timeouts for waiting lock requests. When it is determined that actual deadlocks are detected frequently, the processing time for deadlock detection may be reduced, for example, by using parallel forward or backward search operations and/or by according higher priority in deadlock detection processing to locks which are more likely to involve deadlocks.

16 Claims, 8 Drawing Sheets

METHOD AND SYSTEM FOR DEADLOCK DETECTION IN A DISTRIBUTED ENVIRONMENT

CROSS-REFERENCE TO RELATED APPLICATIONS

This is a divisional application of application Ser. No. 11/075,068, filed Mar. 8, 2005 now U.S. Pat. No. 7,735,089, invented by Wilson Chan, entitled "Method and System for Deadlock Detection in a Distributed Environment," the contents of which are hereby incorporated by reference in its entirety for all purposes.

FIELD OF THE INVENTION

The present invention relates to managing deadlock detection for overlapping requests for resources on a computer system using locks, and more particularly to techniques to speed deadlock detection among nodes of a distributed lock manager.

BACKGROUND OF THE INVENTION

In distributed data processing systems, data objects or resources such as database tables, indexes, files, and other data structures are often shared by multiple processes. If a data object or resource is accessed by two or more processes during the same time interval, problems may arise depending on the nature of the access. For example, if one process attempts to write a data object while another process is reading the data object, an inconsistent set of data may be obtained by the reading process. Similarly, if two processes attempt to write to the same data object during the same time interval, data corruption may result. In both cases, the accessing processes are said to have a "resource conflict," the resource being the shared data object.

A long standing challenge in computing is the detection of deadlocks. A deadlock is a state assumed by a set of entities wherein each entity in the set is waiting for the release of at least one resource owned by another entity in the set. Entities capable of owning a resource may be referred to as possessory entities. In the context of operating systems, for example, possessory entities may include processes and applications. In the context of a database system, for example, possessory entities may include processes and transactions. A transaction is an atomic unit of work.

For example, a transaction T1 may seek exclusive ownership of resources R1 and R2. If R1 is available and R2 is currently exclusively owned by another transaction T2, transaction T1 may acquire exclusive ownership of R1 but must wait for R2 to become available. A deadlock will occur if transaction T2 exclusively owns R2 but seeks ownership of R1, and T2 is suspended to wait for R1 without releasing R2. Because both T1 and T2 are waiting for each other, and neither can proceed until the resource needed by each is released by the other, they are deadlocked.

Computer systems employ a variety of deadlock handling mechanisms (deadlock handlers) that detect deadlocks. Some deadlock handlers employ a "cycle" technique to detect deadlocks. In the cycle technique, after a process waits a threshold period of time for a resource, a wait-for graph may be generated and examined for cycles. If any cycles are identified, then the deadlock detection mechanism has identified a potential deadlock.

Figure 7:
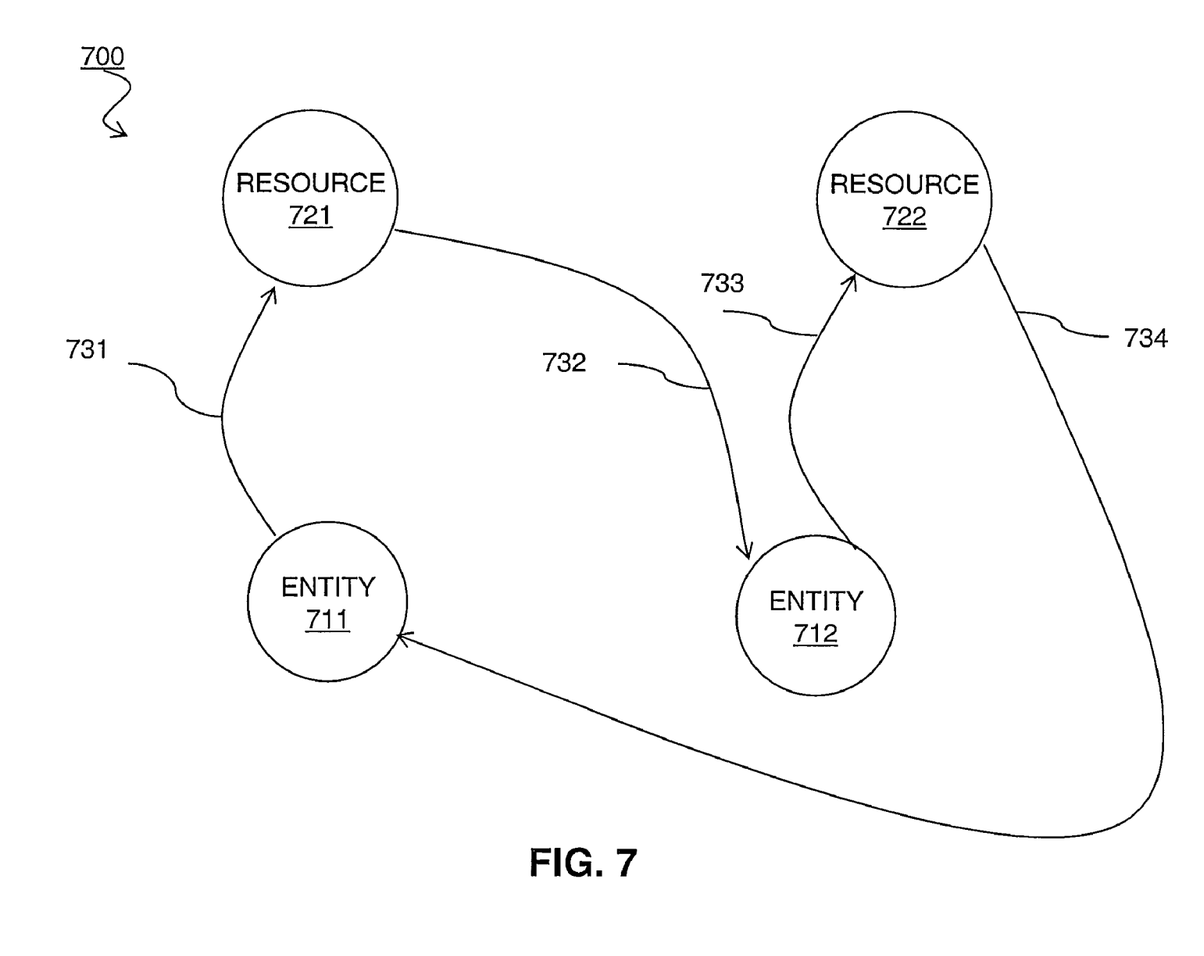
FIG. 7 depicts an exemplary wait-for graph showing dependencies among entities and resources in a computing environment.

FIG. 7 depicts an exemplary wait-for graph 700, which includes entity vertices 711 and 712 and resource vertices 721 and 722. Wait-for graph 700 was generated when a deadlock handler detected that a process represented by entity vertex 711 had waited a predetermined threshold period of time for the resource represented by resource vertex 721. Arc 731 indicates that the process represented by entity vertex 711 is waiting for the release of the resource represented by resource vertex 721. Arc 732 indicates that the resource represented by resource vertex 721 is owned by the process represented by entity vertex 712. Arc 733 indicates that the process represented by entity vertex 712 is waiting for the release of the resource represented by resource vertex 722. Arc 734 indicates that the resource represented by resource vertex 722 is owned by the resource represented by entity vertex 711.

Arcs 731, 732, 733, and 734 form a loop that both extends from and leads to entity vertex 711, and thus indicates a cycle. The processes represented by the entity vertices of wait-for graph 700 are therefore potentially deadlocked.

In a distributed computer system, a deadlock may involve entities and resources that reside on multiple nodes. Potential deadlocks may be detected through the generation of distributed wait-for graphs. The vertices of a distributed wait-for graph may thus represent entities ("distributed entities") and resources ("distributed resources") that reside on different nodes. To generate a distributed wait-for graph, each node generates a portion of the wait-for graph that corresponds to entities that reside on the node. In particular, each node examines lock data structures that reside on the node, and generates wait-for graph elements that represent the node's portion of the distributed wait-for graph.

A cycle in a distributed wait-for graph may thus include vertices that represent entities and resources distributed over multiple nodes. In addition, the cycle may be represented by wait-for graph elements distributed over multiple nodes and which refer to lock structures that reside on the multiple nodes. An exemplary deadlock detection technique employing cycles is described in commonly-owned U.S. Pat. No. 6,304,938, entitled "Detecting a State Change in a Lock Structure to Validate a Potential Deadlock" to Srivastava.

Resource Locking

Resource locking is one technique used to avoid resource conflicts in multiprocessed applications and distributed systems. Resource locking is a protocol in which processes signal their use of a resource by acquiring a lock on the resource from a lock manager. The resources may include data objects, processes, memory regions, registers, I/O devices, files, tables, rollback segments, row cache, library cache, temporary segments, transactions, transaction slots, parallel execution slaves, etc. A lock is a data structure that indicates that a particular process has been granted certain rights with respect to a resource. There are many types of locks. Some types of locks may be shared on the same resource by many processes, while other types of locks prevent any other locks from being granted on the same resource. Before using a resource, a requesting process checks to see if the corresponding lock is available. If so, the requesting process acquires the lock and uses the resource, releasing the lock when finished. If the lock is not available, the requesting process waits for the lock to be released by the prior acquiring process before using the resource.

In most resource locking systems, multiple processes may concurrently lock a resource so long as their respective uses of the resource are compatible. Generally, a process indicates the nature of its intended use of a resource by acquiring a lock to the resource in a particular mode. For example, a process that needs to write to a resource would typically acquire the corresponding lock in an exclusive mode to indicate that no other process should have read or write access to the resource. Once a resource is locked by an exclusive lock, requests to obtain the lock for read or write purposes are denied. On the other hand, a process that merely needs to read the resource could acquire the lock in a non-exclusive mode to indicate that other processes may concurrently read the resource. Since the locking mode is indicative of the use of the resource, locks themselves may be referred to as being compatible or incompatible with each other. For example, exclusive locks are generally incompatible with any other resource access locks, while non-exclusive locks may be generally compatible with other non-exclusive locks.

Resource Locking in a Database Management System

One application for resource locking is database management. In a database, data is typically stored in tables where it is organized into rows and columns. Before a process operates on a particular database table or a particular set of rows in the database table, it is often desirable for the process to lock the table or a particular set of rows therein to prevent other processes from performing incompatible operations on the table. Then, after the process has completed operating on the database table, the lock is released.

One type of entity responsible for granting locks on resources is referred to as a lock manager. In a single node computer system, a lock manager may include one or more processes on the node. In a multiple-node system, such as a multi-processing machine or a local area network, a lock manager may include processes distributed over numerous nodes. A lock manager that includes components that reside on two or more nodes is referred to as a distributed lock manager (DLM).

An undesirable situation that can arise in a resource locking scheme is a deadlock. A deadlock occurs, for example, when a first process attempts to acquire a lock on a resource that is already incompatibly locked by a second process, and the second process likewise attempts to acquire a lock on a resource that is already incompatibly locked by the first process. Since neither process is able to release the lock sought by the other until acquiring the lock held by the other, neither process can proceed. Deadlocks may be resolved by terminating one of the deadlocked processes to allow the other process to continue. In the context of database management, depending on the amount of processing accomplished by a deadlocked process prior to its termination, considerable time and processing effort may be wasted as a result of the deadlock.

For example, in a database environment, a transaction includes a database read, modify and write life cycle. A rollback entry may be made for all transactions unless specific clauses are specified. A single rollback entry may include a pre-update image value, a block address, and a data file number, transaction ID and status of the transaction (e.g., active or committed). If a transaction fails for any reason, a transaction rollback includes recovering the old image from a rollback segment. If a database transaction involves a considerable amount of processing prior to a commit, and a deadlock situation involving the transaction occurs before the commit, the deadlock solution may involve considerable overhead in rollback of the processing done before the deadlock was detected.

In some environments, for example, under Real Application Clusters (RAC), a product of Oracle International Corporation, a global enqueue service (GES) periodically performs deadlock detection on enqueue resources, or memory structures representing resources that are "lockable." Deadlock for enqueue resources may be caused by user applications. If a user application is written in a way to prevent deadlock, deadlock detection is not necessary and is thus potentially wasting processing resources such as CPU time. On the other hand, in some complex applications, deadlock may occur, degrading system performance, and early and efficient deadlock detection is very desirable. Therefore, there is a need for techniques to optimize deadlock detection in distributed systems.

SUMMARY OF THE INVENTION

These and other needs are addressed by methods, systems, and articles of manufacture consistent with the present invention in which deadlock detection optimization is achieved by adjusting the detection technique based on statistics maintained for tracking the number of actual deadlocks that are detected in a distributed system, and/or for which types of locks are most frequently involved in deadlocks. When deadlocks occur rarely, the deadlock detection may be tuned down, for example, by reducing a threshold value which determines timeouts for waiting lock requests. When it is determined that actual deadlocks are detected frequently, the elapsed processing time for deadlock detection may be reduced, for example, by using parallel forward or backward search operations and by according higher priority in deadlock detection processing to locks which are more likely to involve deadlocks.

The present invention stems from the realization that deadlock detection techniques for distributed systems may require substantial processing overhead, and may be performed so frequently that overall system performance may be degraded more by the overhead of checking for deadlocks that do not exist than the degradation caused by system recovery from the detected deadlocks.

One aspect of the present invention relates to a method of deadlock detection. Statistics of frequency of deadlocks detected in a system are collected and a threshold timeout value for a lock is adjusted based on the statistics. If a waiting time associated with the lock exceeds the threshold timeout value, a deadlock detection based on the lock is initiated.

Another aspect pertains to a method for deadlock detection in a distributed system, in which it is determined whether a waiting time for a lock request has exceeded a predetermined timeout time. If the waiting time has exceeded the timeout time, a plurality of deadlock searches is initiated.

Still another aspect involves determining whether a waiting time associated with a lock for a requested resource has exceeded a threshold timeout value. If the waiting time has exceeded the threshold timeout value, a forward search for deadlock or a backward search for deadlock is initiated based on statistics collected on a frequency of detected deadlocks.

A computer-readable medium bearing an instance of a distributed lock manager is disclosed. The distributed lock manager includes a resource object having a granted queue and a convert queue, and a communication means for communicating statistical information regarding a frequency of detected deadlocks associated with a waiting resource lock included in the convert queue. A frequency of initiating deadlock detection searches is adjusted based on the statistical information.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for optimizing deadlock detection in a distributed environment are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, wherein each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Lock Manager

Figure 1:
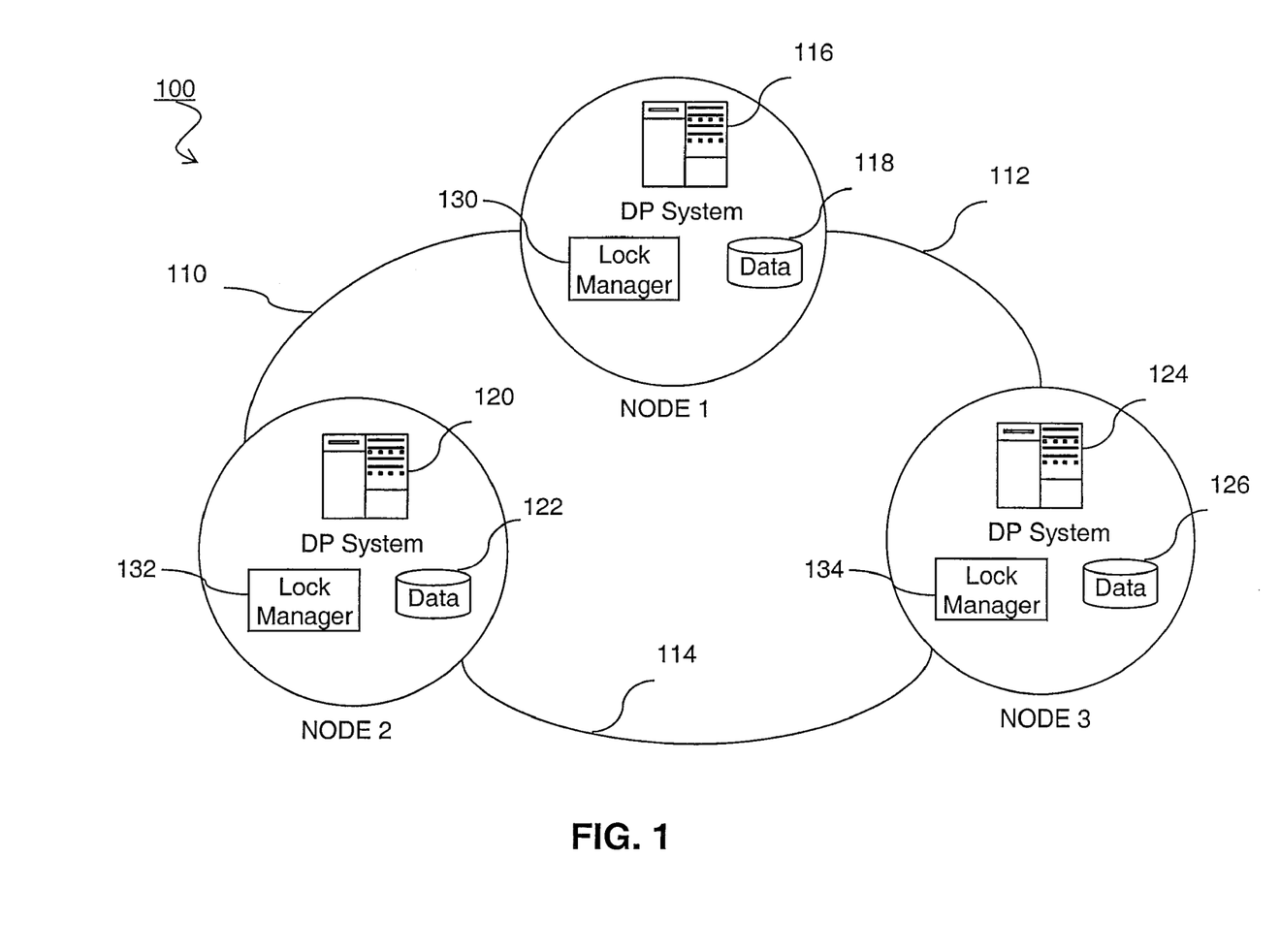
FIG. 1 depicts an exemplary distributed processing system that can be used to implement an embodiment of the present invention.

A lock manager is a mechanism that manages and controls the allocation of locks in a system. The lock manager maintains a set of resource names or indicators and provides operations for allowing multiple processes to synchronize the concurrent access of the resources. In a distributed system, each node in the distributed system may have its own instantiation of a distributed lock manager. For example, FIG. 1 illustrates an exemplary distributed data processing system 100 which includes node 1, node 2, and node 3, coupled together with network links 110, 112, and 114. It will be apparent to one skilled in the art that an arbitrary number of nodes may be supported in a distributed data processing system 100. Each node, such as node 1, includes a data processing system 116 and a data store 118. Each node may include objects or resources that are accessed and shared with any of the other nodes. Thus, although data store 118 resides on node 1, data store 118 may be a shared resource accessible by data processing systems 120 and 124 on nodes 2 and 3, respectively. In the distributed system illustrated in FIG. 1, node 1 includes a distributed lock manager instance 130, node 2 includes a distributed lock manager instance 132, and node 3 includes a distributed lock manager instance 134.

If a process seeks to access a resource, it sends a lock request to the lock manager. When the lock manager grants a lock to the process, the lock manager holds the lock for that process until the process indicates that the lock is no longer needed, at which time the lock can be validly released by the lock manager. Each lock granted to a process is typically associated with an access mode that determines the type and scope of access granted to the process. The following are examples of access modes that may be employed: Null Mode ("NL mode"), Concurrent Read Mode ("CR mode"), Concurrent Write Mode ("CW mode"), Protected Read Mode ("PR mode"), Protected Write Mode ("PW mode"), and Exclusive Mode ("EX mode").

In Null mode, a lock does not convey any access rights. Typically, a lock is held at this level to indicate that a process is interested in a resource or that a process intends to later convert to an access mode that does grant access rights. A lock granted with this access mode can also be considered an "intent" mode lock.

In Concurrent Read Mode, the associated resource is read in an unprotected fashion by the holding process. Other processes can both read and write to the associated resource while it is held in concurrent read mode.

In Concurrent Write Mode, the associated resource is read or written in an unprotected fashion by the holding process. Other processes can both read and write to the resource while it is held in concurrent write mode.

Protected Read Mode can also be referred to as the "shared" mode. When a lock is held at this level, no process can write the associated resource. However, multiple other processes can concurrently perform reads upon the same resource.

Protected Write Mode can also be referred to as the "update" mode. Only one process at a time can hold a lock at this level. This access mode permits a process to modify a resource without allowing any other processes to modify the resource at the same time. However, this mode allows other processes to concurrently perform unprotected reads.

In Exclusive Mode, a lock grants exclusive access to the resource to the holding process. No other process may read or write to the resource.

For this example, multiple processes are normally allowed to concurrently access the same resource if the scope of the requested access modes are compatible with each other. Thus, a lock request for a particular access mode to a resource may be immediately granted if it is compatible with the access modes of locks that have already been granted. However, a lock request that is incompatible with one or more already granted lock modes is blocked or queued until the prior incompatible lock(s) are released.

This principle similarly applies to lock conversions. Lock conversions are changes in state from one access mode to another, and are initiated by a process in order to change its access rights to the resource. As with a new lock request, if the requested conversion mode is incompatible with already granted lock modes, then the lock conversion will be blocked or queued until the prior incompatible lock(s) are released. On the other hand, if the requested conversion mode is compatible with the granted lock modes, then the lock conversion may be immediately granted.

For each of the access modes described above, Table 1 indicates exemplary types of accesses that may be obtained on a resource given the access modes that are already being held by other processes on the resource.

TABLE 1

| Mode of Requested Lock | Mode of Currently Granted Lock | | | | | |
|---|---|---|---|---|---|---|
| | NL | CR | CW | PR | PW | EX |
| NL | Grant | Grant | Grant | Grant | Grant | Grant |
| CR | Grant | Grant | Grant | Grant | Grant | Queue |
| CW | Grant | Grant | Grant | Queue | Queue | Queue |
| PR | Grant | Grant | Queue | Grant | Queue | Queue |
| PW | Grant | Grant | Queue | Queue | Queue | Queue |
| EX | Grant | Queue | Queue | Queue | Queue | Queue |

To illustrate the application of Table 1, consider a shared resource that is currently being locked by a first process in PR mode. If a second process requests a PR mode lock on the same resource, then the lock request can be immediately granted, since the modes of the requested lock and the granted lock are compatible. However, if the second process requests an EX mode lock on the resource, then the lock request is blocked or queued until the first process releases its lock or converts to a lock mode that is compatible with the requested lock mode.

Resource Objects

Figure 2:
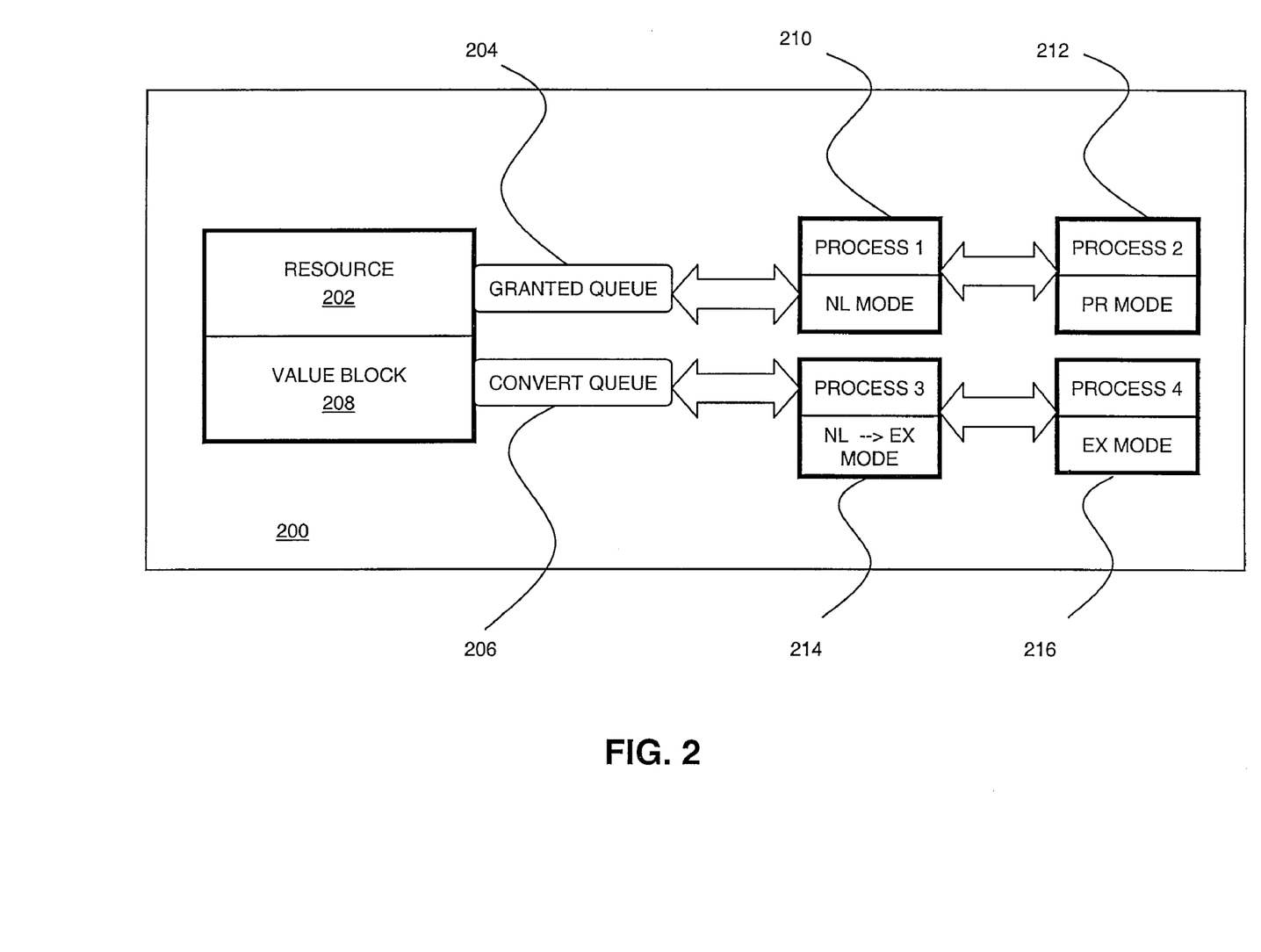
FIG. 2 depicts an exemplary resource object according to an embodiment of the present invention.

A "resource object," or "lock object," may be maintained for each system resource whose access is being managed by the lock manager. FIG. 2 illustrates an exemplary resource object 200. Each shared resource in the system locked by one or more processes corresponds to a resource object 200. Each resource object 200 is associated with a resource name 202. Each resource object 200 includes an associated granted queue 204, an associated convert queue 206, and an associated value block 208.

The resource objects that are discussed herein may be implemented within various types of entities, including processes, threads, or the kernel of an operating system. In the following discussion, a resource object performs an action if the entity which implements the resource object performs the action.

The granted queue 204 includes a queue of locks granted on the associated resource name 202. When a lock is granted to a process, the granted lock is placed on the granted queue 204. The exemplary granted queue 204 may be implemented as a doubly linked list of granted lock(s), wherein each granted lock may include a structure indicating at least the identity of the calling process and the access mode granted to that process. In the example shown in FIG. 2, granted queue 204 includes two granted locks 210 and 212. Granted lock 210 is held by Process 1 in NL mode and granted lock 212 is held by Process 2 in PR mode.

The convert queue 206 includes a queue of lock requests for the associated resource. If a lock request or lock conversion request conflicts with prior granted locks, then the requested lock is placed onto the convert queue 206 until it can be granted. When the requested lock is granted, the lock request is removed from the convert queue 206 and linked onto the granted queue 204. In this example, the convert queue 206 may be implemented as a doubly linked list of lock request(s), wherein each lock request structure indicates at least the identity of the calling process and the access mode requested by that process. In the example shown in FIG. 2, the convert queue 206 includes two lock requests 214 and 216. Lock request 214 was initiated by Process 3, and is a request for a lock conversion from NL mode to EX mode. Lock request 216 was initiated by Process 4, and is a request for a lock in EX mode. Lock requests 214 and 216 are queued onto convert queue 206, since each request is incompatible with prior granted locks 210 and 212.

Each exemplary resource object 200 is associated with a value block 208, which is an allocation of memory that can be used to store information about the associated resource or resource object 200. Value block 208 may include an arbitrary quantity of memory, and is not necessarily limited to the size of a single disk block, e.g., the size of the value block 208 may be set at 16 bytes. Alternatively, the size of value block 208 can be dynamically configured, and may be set at the time the associated resource object 200 is created.

Value block 208 may be read or written to by processes whenever a lock request or lock conversion request is made on the associated resource. As an alternative, value block 208 may only be written to by a process that holds the resource in PW or EX mode, and only if the process is converting the lock to the same or lower mode on the lock hierarchy; however, in this alternative, the value block 208 can still be read by any calling process.

An integrated distributed lock manager may maintain information about locks on all nodes that need access to a particular resource. The integrated distributed lock manager may nominate one node, for example, to act as a master node, to manage all relevant information about a resource and its locks. Every resource may be associated with a master node. When a resource is mastered remotely, conflicting accesses to the resource may result in the transmission of messages to the master node for the resource, thus increasing internode message traffic and potentially degrading system performance.

Persistent Resource Objects

The resource objects may be persistent, and thus provide finer granularity locking by allowing shared resource objects to be dynamically allocated and de-allocated. The lock manager may initialize a resource object when the first lock is opened on a resource name. Each resource object may be maintained in memory until the last lock is released upon that resource name. When the last lock is released, the resource object may be de-allocated, freeing the system overhead and memory tied up by the resource object. In this manner, fine granularity locks can be dynamically created to cover minute portions of the shared system resources for some duration, without excessively incurring system overhead and memory. Thus, locks can be created at granularities fine enough to cover one or more individual blocks of memory, or even smaller units of the system resources.

The resource object is not immediately released, however, even if all locks have been released on the associated resource, if the lock release was caused by an abnoimal event which creates the possibility of inconsistent data on the system. Instead of being immediately released, the associated resource object may be marked to indicate that it is in a "dubious" state, and may persist until the appropriate corrective or validation steps are taken. An example of such an abnormal event is the death of a process while the process was holding an EX or PW mode lock on a resource. If this abnormal event occurs, there is a possibility that the process had made uncommitted modifications to the resource prior to its death, which could affect the integrity of the system data.

Distributed Lock Manager

A distributed lock manager is a networked component that is configured to synchronize access to, and control allocation and modification of, resources in a distributed, relational database system. Any process at any node in the distributed database system that requires a resource protected by the distributed lock manager needs to acquire a lock on that resource. The distributed lock manager may coordinate concurrent access to resources, such as data blocks and rollback segments, across multiple instances. Other exemplary resources may include data objects, processes, memory regions, registers, I/O devices, files, tables, row cache, library cache, temporary segments, transactions, transaction slots, and parallel execution slaves. For resilience, fault tolerance, and enhanced runtime performance, instances of the distributed lock manager are distributed among various nodes and maintain portions of a lock database in memory. The lock database records information about which locks are held on which resources. The instance that manages the locks for a particular resource, for example by storing information about the locks in an in-memory lock database, is the master instance. After a change in the configuration of the distributed database system, the master instance for each locked resource can be reassigned to another node.

Therefore, a lock on a resource can be considered to be a distributed object, and assigning a master instance for resource locks can be considered as hosting the distributed object at a node. A fault-tolerant, relational database system may create and use a large number of resource locks, which may be relatively short-lived but which need to survive the failure of their master instance, and thus using distributed lock managers may be particularly advantageous.

The distributed lock manager keeps an inventory of all these lock requests, and communicates their status to the users and processes involved. To communicate the status of lock requests, a distributed lock manager may, for example, use at least two types of asynchronous traps (ASTs) or interrupts: an acquisition AST and a blocking AST. When a lock is obtained in its requested mode, an acquisition AST (i.e., a "wakeup call") is sent to tell the requestor that the requestor owns the lock. When a process requests a certain mode of lock on a resource, the distributed lock manager may send a blocking AST to notify processes which currently own locks on that resource in incompatible modes (e.g., shared and exclusive modes may be incompatible). Upon notification, owners of locks can relinquish them to permit access by the requestor.

Deadlock

Figures 3A, 3B:
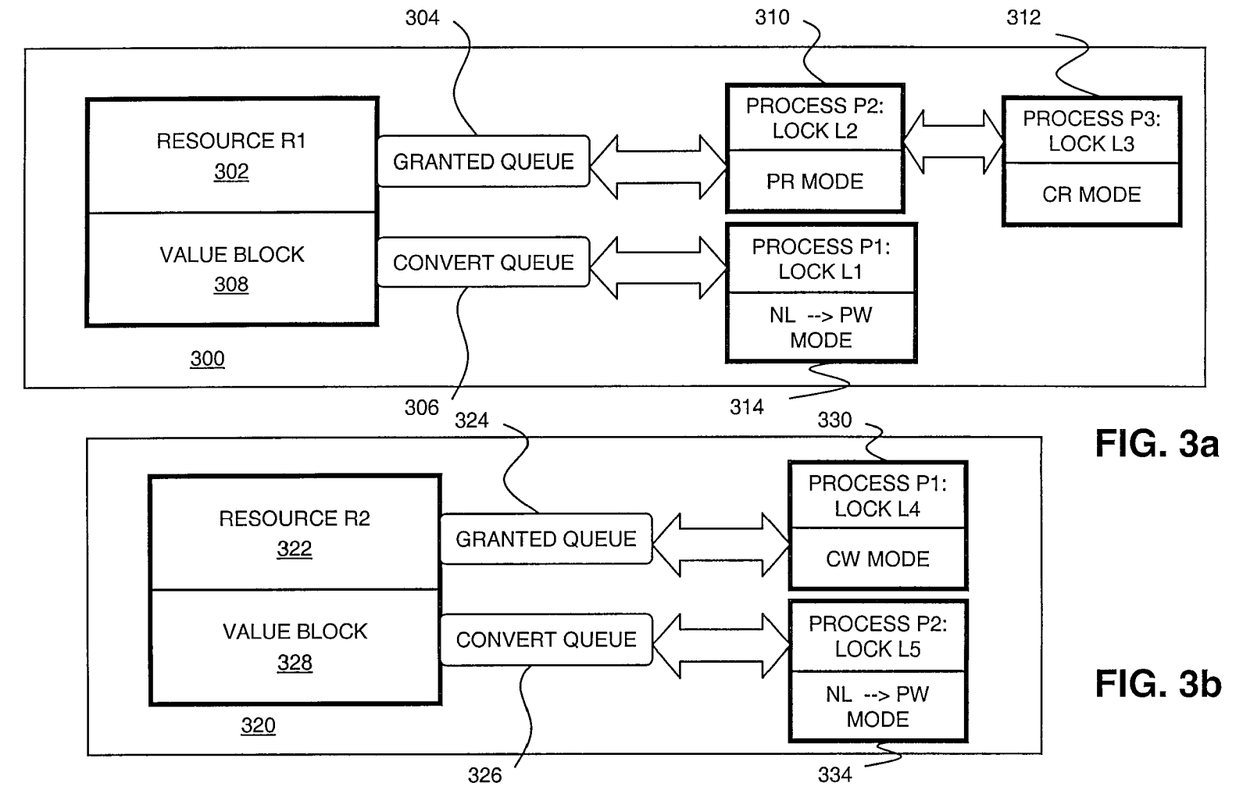
FIGS. 3a-3c depict an exemplary deadlock situation involving resource objects in a distributed environment according to an embodiment of the present invention.
Figure 3C:
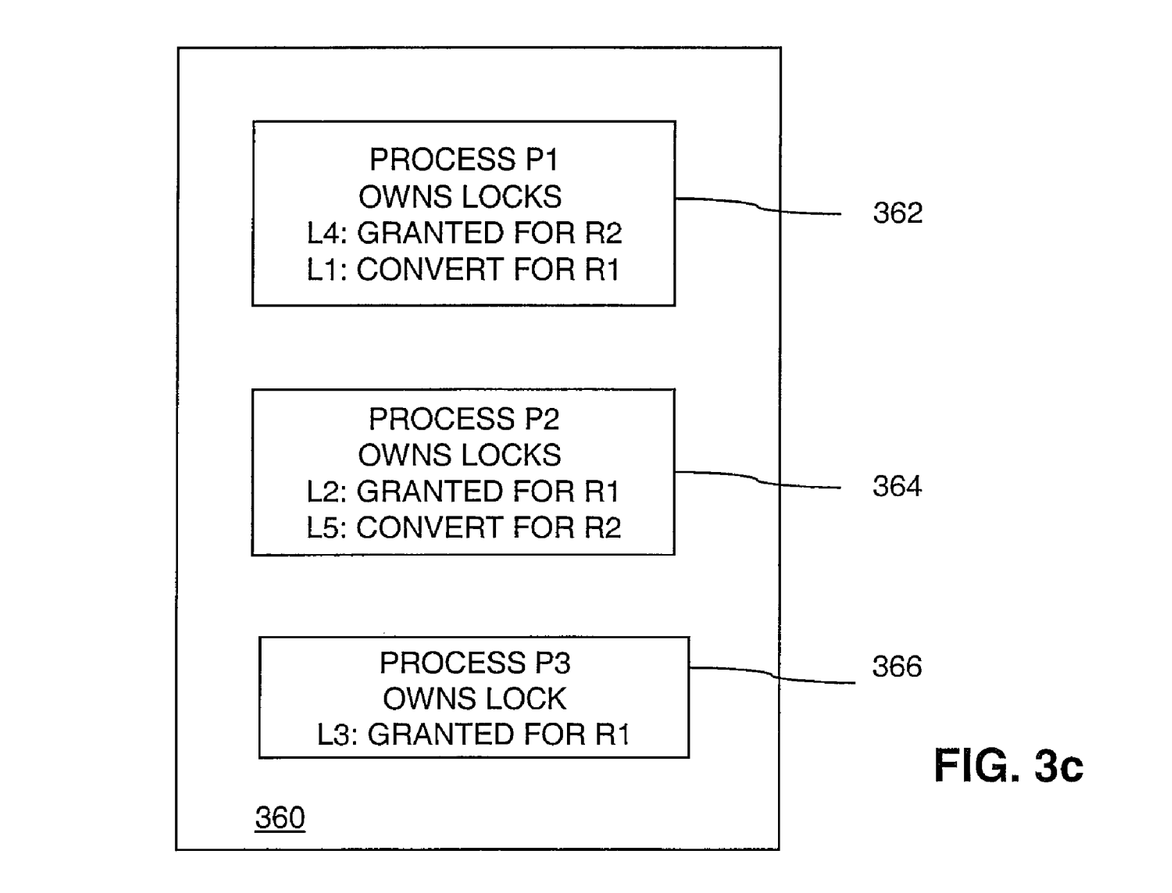

FIGS. 3a-3c depict an exemplary deadlock situation between processes requesting two resources R1 and R2 in a distributed environment. As shown, resource objects 300 and 320, which may reside on remote nodes, include resources 302 and 322 named R1 and R1, respectively. Each resource object includes a value block 308, 328, a granted queue 304, 324, and a convert queue 306, 326. The granted queue 304 of resource R1 includes granted lock 310, representing lock L2 owned by process P2, in PR mode, and granted lock 312, representing lock L3 owned by process P3, in CR mode. The convert queue 306 of resource R1 includes lock request 314 for process P1, requesting a conversion of lock L1 from NL to PW mode. The granted queue 324 of resource R2 includes granted lock 330, representing lock L4 owned by process P1, in CW mode. The convert queue 326 of resource R2 includes lock request 334 for process P2, requesting a conversion of lock L5 from NL to PW mode. FIG. 3c depicts an exemplary storage representation 360 for storage areas 362, 364, and 366 containing at least information, for each of processes P1, P2, and P3, regarding the locks L1-L5 owned by each respective process, indicating the resource associated with the lock, and a status of whether the lock is currently granted or is in a convert queue. Each of the storage areas 362, 364, 366 may, for example, be implemented as tables, and may be located locally with its associated process.

For this example, process P2 owns granted lock L2 on resource R1 in PR mode and owns lock L5 which is currently in the convert queue 326 for resource R2, requesting a conversion from NL mode to PW mode. Process P1, meanwhile, owns granted lock L4 on resource R2 in CW mode and owns lock L1 which is currently in the convert queue 326 for resource R2, requesting a conversion from NL mode to PW mode. Using the access information of Table 1, since process P1 is requesting lock L1 on resource R1 in PW mode, and since process P2 currently owns lock L2 on resource R1 in PR mode, the request of P1 is incompatible with lock L2 and is queued in the convert queue 306 of resource R1. Since process P2 is requesting lock L5 on resource R2 in PW mode, and since process P1 currently owns lock L4 on resource R2 in CW mode, the request of P2 is incompatible with lock L4 and is queued in the convert queue 326 of resource R2. For this example, each of the processes P1 and P2 are suspended, and neither can progress until granting of its requested resource, which is held by the other process, and thus the processes are deadlocked.

The example shown in FIGS. 3a-3c illustrates information for a very simple case involving only two resources, three processes, and five locks; however, deadlock situations may involve very large numbers of resources, processes and locks, such that a detection of deadlock may involve searching numerous levels of convert queue lock dependencies, thus potentially requiring significant processing resources for detection.

Deadlock Detection

It is desirable that deadlock detection should finish as quickly as possible. Assuming a distributed environment, a deadlock detection search may be performed as follows:

For each lock owned by a process, associate with the lock a timestamp indicating the time the lock entered its current queue state, for example, a state of waiting in a convert queue. At periodic predetermined intervals of time, perform a deadlock detection search as follows. For the locks in the convert queue, determine which of the timestamps indicate that the associated lock has been in its current state of waiting longer than a predetermined timeout time. The timeout time may be predetermined initially, for example, for a value indicating five minutes, and the timeout time may be adjusted upward or downward based on results of analysis of deadlock detection methods used.

It may be desirable to limit the amount of time searching for deadlock, as it is possible to spend significant processing time in response to determining a potential deadlock, only to find there is no deadlock. Thus, a timestamp may be associated with the initialization of a deadlock search, for example, by storing the timestamp value locally with a search instance. If the search progresses longer than a predetermined threshold search time, the search may be terminated, and the threshold search time may be increased so that if the same potential deadlock exists at some point in the future (i.e., the situation has not resolved itself), the deadlock search may be initialized again, but for a longer duration of search time. In this way, it may be possible to further optimize the amount of time spent searching for complex potential deadlocks that are not actually deadlocks.

In determining an exemplary search for deadlock, a first lock L1 is selected that is owned by process P1, that has been in a convert queue longer than the predetermined timeout time, and that still has not been granted its requested resource, as a long wait for the resource may indicate a potential deadlock situation.

Single Path, Single Direction Search

As an exemplary single path, single direction search method, the resource R for which this lock L1 has been waiting is examined. Assuming a distributed environment, a deadlock search starts at the master instance of resource R. Locks on the granted queue of this resource R are scanned, for example, locks L2, L3, L4. Those locks L2, L3 and L4 which are blocking L1 are analyzed one by one. If L2 is a remote lock for instance B of resource R, a message is sent to instance B to determine the process P2 owning lock L2. The converting locks owned by P2 are then scanned one by one to determine which processes own granted locks that are currently blocking the individual converting lock owned by P2 on the resources for which the processes own locks. If P2 owns no converting locks, the deadlock search is then backtracked to L3. The search continues until the path is traced back to P1, which means a deadlock is detected, or until it is determined that the blocking processes are not waiting for any locks and no more backtracking is indicated, which indicates that there is no deadlock.

Forward Search

As an alternative, searches may be initiated in parallel, either as forward searches or as backward searches. As an exemplary forward search, the resource R for which the lock L1 has been waiting is examined. Assuming a distributed environment, the deadlock search starts at the master instance of resource R. Locks on the granted queue of this resource R are scanned, for example, locks L2, L3, L4, which are remote locks. Those locks L2, L3 and L4 which are blocking L1 are determined and messages are sent simultaneously to instances B, C, and D of resource R for which L2, L3 and L4 are requesting locks, and the detection continues in the instances B, C, D in parallel. The search path that ends with no converting locks will terminate there, with no need for backtracking, and if a search path reaches back to P1, a deadlock is declared. This technique of searching in parallel may significantly reduce the elapsed search time from the initiating of the search to the termination of the search if deadlock is detected, but adds the overhead of sending messages to instances B, C, D in parallel and searching each instance, even when it may turn out that deadlock is detected on the path for instance B, and thus the search would be unnecessary for instances C and D.

Backward Search

Alternatively, as an exemplary backward-searching deadlock detection method, instead of starting detection by looking at locks L2, L3, L4 which are blocking lock L1 owned by process P1, another search can be performed at the same time by scanning all the granted locks owned by P1, for example, L5 and L6, and by analyzing all the locks being blocked by L5 and L6. By doing two searches in two different directions, a deadlock can be declared when the two search paths meet, thus reducing detection time.

The exemplary deadlock detection methods discussed above may be combined to achieve even faster detection.

Figure 4:
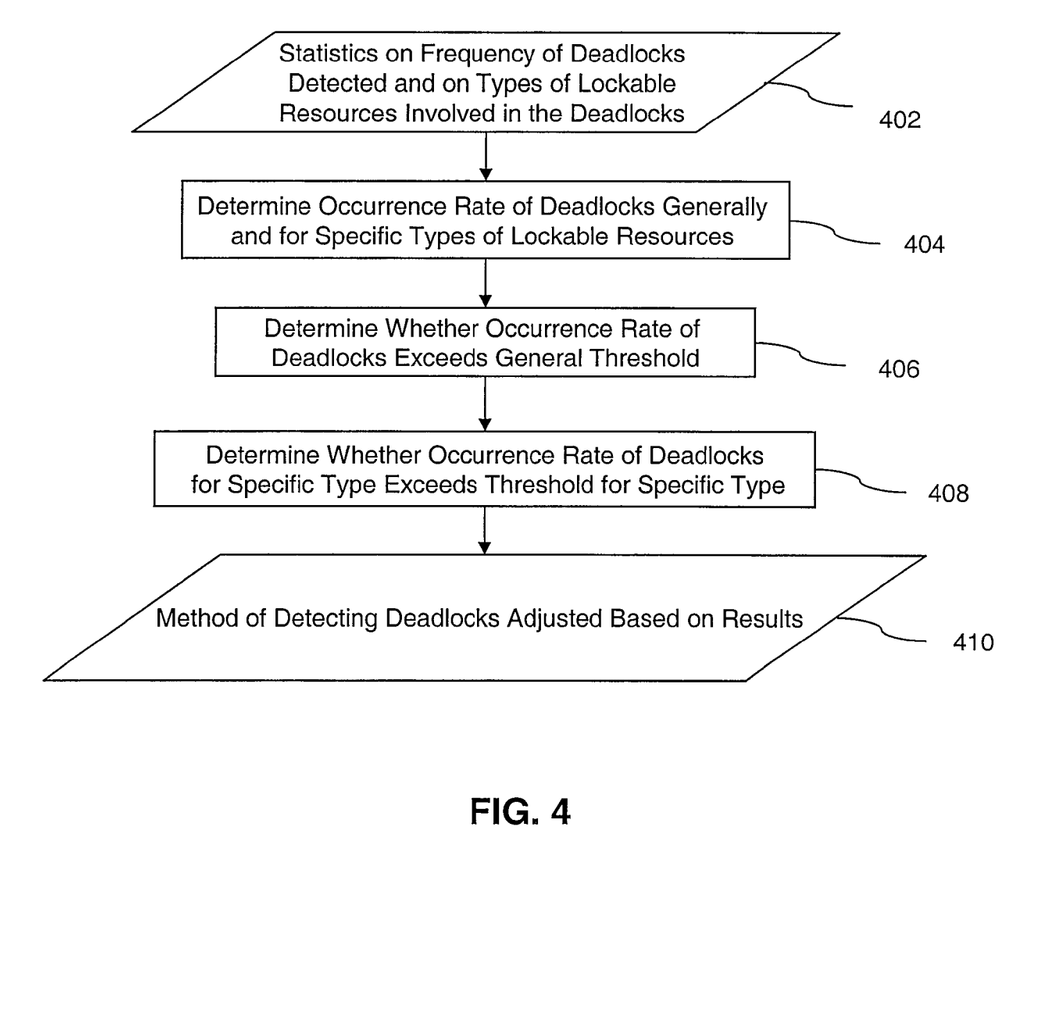
FIG. 4 depicts a flow of steps for collecting and analyzing statistics for deadlock detection techniques according to an embodiment of the present invention.

FIG. 4 illustrates exemplary steps taken for determining how to optimize deadlock detection in a distributed system. At step 402, a request is received, or a need is recognized, for collecting statistics on the frequency of deadlocks detected and on which types of locks are involved in the deadlocks. At step 404, the statistics are collected and analyzed to determine an occurrence rate of deadlocks detected generally and for specific types of locks. At step 406, it is determined whether the occurrence rate of deadlocks detected exceeds a predetermined threshold value of detected deadlocks. At step 408, it is determined whether the occurrence rate of deadlocks detected for a specific type of lock exceeds a predetermined threshold value of detected deadlocks for the specific type of lock. At step 410, a method of detecting deadlocks is adjusted based on results of determining the occurrence rate of deadlocks detected generally and the occurrence rate of detected deadlocks for the specific type of resource. For example, if the general occurrence rate is high, the method of detecting deadlocks may be adjusted by adjusting the timeout time for a lock in the convert queue of a resource, thus encouraging more frequent performance of the deadlock detection. If the occurrence rate is high for a specific type of lock, the timeout time for that specific type of lock may be adjusted, and the deadlock detection method may be adjusted to afford a higher priority to checking the specific type of lock for potential deadlocks.

Thus, for an employed deadlock detection method, statistics are maintained tracking the number of actual deadlocks that are detected, and which types of locks are most frequently involved in deadlocks. When deadlocks occur rarely, the deadlock detection may be tuned down, for example, by reducing a threshold value. When it is determined that actual deadlocks are detected frequently, the deadlock detection time may be reduced, for example, by using the parallel operations described above and by according higher priority in deadlock detection to locks which are more likely to involve deadlocks.

For example, the frequency of deadlock may be calculated by counting the number of deadlocks actually detected over a predetermined period of time. If the frequency is determined to be low, then the timeout interval may be adjusted upward to produce less frequent checks for deadlock. In this case, the single path and single direction search may be used for deadlock detection. However, if the frequency is determined to be high, or if particularly complex applications are executing that may involve deadlock and the user desires deadlock detection as soon as possible, then the timeout interval may be adjusted downward to produce more frequent checks for deadlock. In this case, faster techniques such as forward and reverse searching may be used for deadlock detection The statistics may also be used to determine which method of deadlock detection may be used, for example, if there are few deadlocks, then the single path, single direction search may be used. If there are numerous deadlocks detected, then the reverse method may be used if it is further determined that a particular process owns a large number of converting locks. Otherwise, the forward method may be used, or the forward and backward methods may be combined to produce a faster search.

Figure 5:
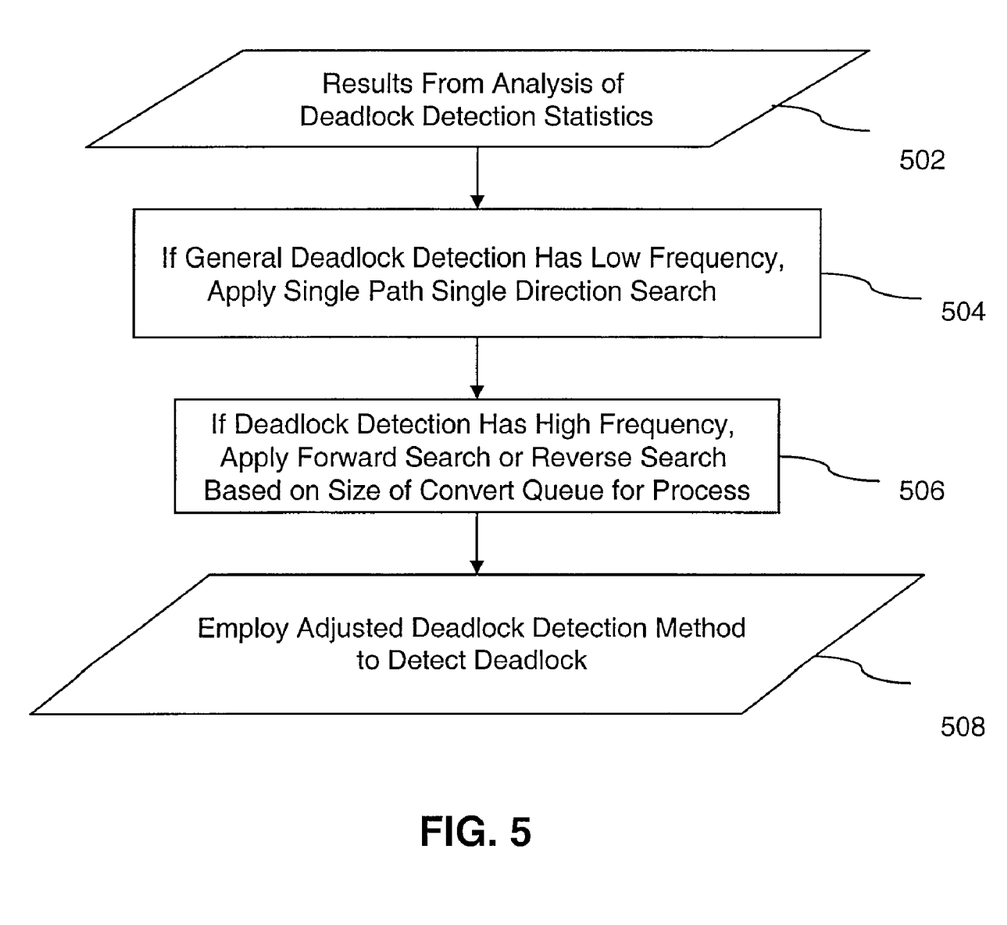
FIG. 5 depicts a flow of steps for adjusting deadlock detection techniques based on collected statistics according to an embodiment of the present invention.

FIG. 5 illustrates exemplary steps taken for optimizing deadlock detection in a distributed system. At step 502, the results from analysis of the statistics of deadlock detection are received. At step 504, if it is determined that deadlock detection generally has a low frequency, then a single path, single direction search may be applied as a search method for detecting deadlocks. At step 506, if it is determined that deadlock detection has a high frequency, then a forward search or reverse search in parallel may be applied as a search method for detecting deadlocks, based on the size of a convert queue of a particular process. The decision to perform forward or backward searching may be adjusted as it is determined that a particular process has a large number of converting locks, as the forward method may be slower than the reverse method for that case. At step 508, the adjusted deadlock detection method is employed to detect deadlock.

Some advantages of using these techniques include better utilization of CPU by performing detection based on history/statistic of detection to reduce detection time. In a database environment, these techniques may reduce the time to resolve deadlock and may increase overall transaction performance.

Hardware Overview

Figure 6:
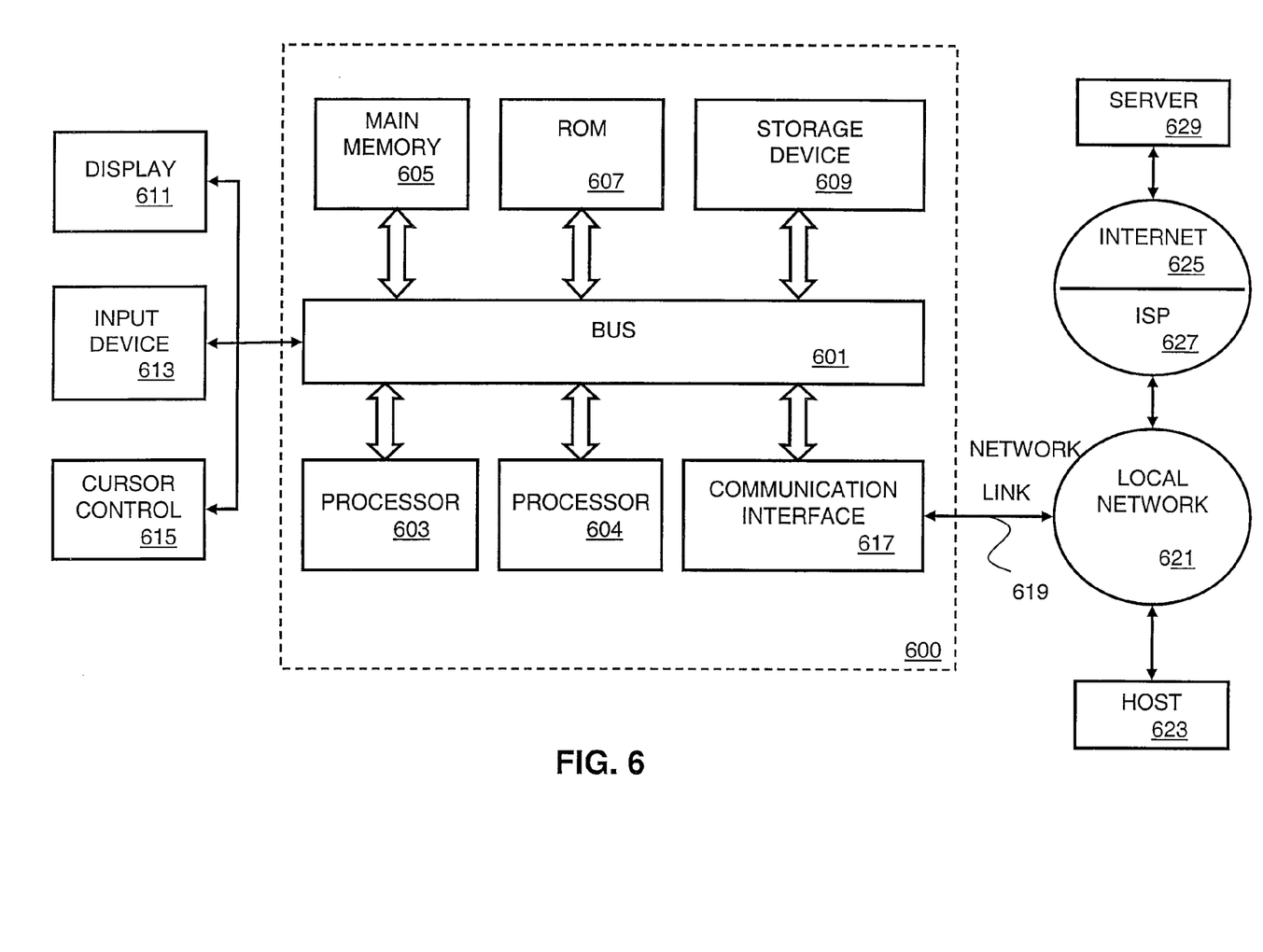
FIG. 6 illustrates an exemplary architecture of a computer system within a distributed processing system.

FIG. 6 illustrates a computer system 600 upon which an embodiment according to the present invention can be implemented. Each node of the distributed processing system 100 may comprise a computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions. The computer system 600 may further include a second processor 604 coupled to the bus 601.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, optimization of deadlock detection is provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider 627. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server 629 might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor 603.

While the present invention has been described in connection with a number of embodiments and implementations, the present invention is not so limited but covers various obvious modifications and equivalent arrangements, which fall within the purview of the appended claims.

What is claimed is:

1. A method of deadlock detection, comprising:
   collecting statistics of a frequency of deadlocks detected for one or more resources in a system;
   based on the statistics, adjusting a threshold timeout value that controls an initiation of a search for a deadlock, wherein adjusting the threshold timeout value comprises;
   based on the statistics, determining the frequency of deadlocks detected for the one or more resources;
   comparing a threshold deadlock occurrence rate to the frequency of deadlocks detected for the one or more resources;
   based on said comparison, adjusting the threshold timeout value to change a frequency of performing searches for deadlocks;
   if a waiting time associated a the lock exceeds the threshold timeout value,
   initiating the search for the deadlock based on the lock; and
   wherein the method is performed by one or more computing devices.

2. A method according to claim 1, wherein the collecting statistics includes collecting statistics of frequency of deadlocks detected, classified according to (a) a lock type associated with the deadlocks detected or (b) a type of resource associated with the deadlocks detected.

3. A method according to claim 2, wherein the collecting statistics includes collecting statistics of frequency of deadlocks detected classified according to a lock type associated with the deadlocks detected.

4. A method according to claim 2, wherein the collecting statistics includes collecting statistics of frequency of deadlocks detected classified according to a type of resource associated with the deadlocks detected.

5. A method according to claim 2, further including determining a priority of initiating the deadlock detection, based on the classified frequency of deadlocks.

6. A method according to claim 1, wherein the deadlock detection includes a parallel search or a single path, single direction search over a plurality of nodes in a distributed system.

7. A method according to claim 1, further comprising selecting a type of deadlock search to perform during the search for deadlock based on the statistics.

8. A method according to claim 7, wherein the type of deadlock search comprises at least one of a single direction search, a parallel search, a forward search, and a backward search.

9. A non-transitory computer-readable storage storing instructions for deadlock detection, said instructions being arranged, upon execution, to cause one or more processors to perform the steps of:
   collecting statistics of a frequency of deadlocks detected for one or more resources in a system;
   based on the statistics, adjusting a threshold timeout value that controls an initiation of a search for a deadlock, wherein adjusting the threshold timeout value comprises;
   based on the statistics, determining the frequency of deadlocks detected for the one or more resources;
   comparing a threshold deadlock occurrence rate to the frequency of deadlocks detected for the one or more resources;
   based on said comparison, adjusting the threshold timeout value to change a frequency of performing searches for deadlocks;
   if a waiting time associated a the lock exceeds the threshold timeout value,
   initiating the search for the deadlock based on the lock; and
   wherein the method is performed by one or more computing devices.

10. A non-transitory computer-readable storage according to claim 9, wherein the collecting statistics includes collecting statistics of frequency of deadlocks detected, classified according to (a) a lock type associated with the deadlocks detected or (b) a type of resource associated with the deadlocks detected.

11. A non-transitory computer-readable storage according to claim 10, wherein the collecting statistics includes collecting statistics of frequency of deadlocks detected classified according to a lock type associated with the deadlocks detected.

12. A non-transitory computer-readable storage according to claim 10, wherein the collecting statistics includes collecting statistics of frequency of deadlocks detected classified according to a type of resource associated with the deadlocks detected.

13. A non-transitory computer-readable storage according to claim 10, further storing instructions associated with one of the deadlock detection searches to cause the one or more processors to perform the step of determining a priority of initiating the deadlock detection, based on the classified frequency of deadlocks.

14. A non-transitory computer-readable storage according to claim 9, further storing instructions associated with one of the deadlock detection searches to cause the one or more processors to perform a parallel search or a single path, single direction search over a plurality of nodes in a distributed system.

15. A non-transitory computer-readable storage according to claim 9, further comprising instructions for selecting a type of deadlock search to perform during the search for deadlock based on the statistics.

16. A non-transitory computer-readable storage according to claim 15, wherein the type of deadlock search comprises at least one of a single direction search, a parallel search, a forward search, and a backward search.

* * * * *

UNITED STATES PATENT AND TRADEMARK OFFICE
CERTIFICATE OF CORRECTION

| | | |
|---|---|---|
| PATENT NO. | : 8,286,182 B2 | |
| APPLICATION NO. | : 12/792542 | |
| DATED | : October 9, 2012 | |
| INVENTOR(S) | : Chan | |

It is certified that error appears in the above-identified patent and that said Letters Patent is hereby corrected as shown below:

In column 9, line 1, delete "abnoimal" and insert -- abnormal --, therefor.

In column 12, line 67, after "detection" insert -- . --.

In column 16, line 1, in Claim 1, delete "a the" and insert -- with a --, therefor.

In column 16, line 52, in Claim 9, delete "a the" and insert -- with a --, therefor.

Signed and Sealed this
Eighth Day of January, 2013

David J. Kappos
*Director of the United States Patent and Trademark Office*